United States Patent [19]

Cameron

[11] Patent Number: 4,869,356
[45] Date of Patent: Sep. 26, 1989

[54] CLUTCH DISK WITH SPRING CUSHIONED FRICTION ELEMENT

[75] Inventor: Mickey G. Cameron, Ladson, S.C.

[73] Assignee: Dana Corporation, Toledo, Ohio

[21] Appl. No.: 247,018

[22] Filed: Sep. 20, 1988

[51] Int. Cl.$^4$ ............................................. F16D 69/04
[52] U.S. Cl. ............................ 192/107 M; 192/107 C
[58] Field of Search ..................... 192/107 C, 107 M

[56] References Cited

U.S. PATENT DOCUMENTS

| | | | |
|---|---|---|---|
| 1,492,862 | 5/1924 | Smith | 192/107 C |
| 1,768,997 | 7/1930 | Reed | 192/107 C |
| 1,810,360 | 6/1931 | Loeffler | 192/107 C |
| 1,837,173 | 12/1931 | Reed | 192/107 C |
| 1,868,543 | 7/1932 | Salzman | |
| 1,931,065 | 10/1933 | Drude | 192/107 C |
| 1,949,385 | 2/1934 | Fadely | 192/107 C |
| 1,956,828 | 5/1934 | Fink | 192/107 C |
| 2,008,169 | 7/1935 | Blackmore et al. | 192/107 C |
| 2,053,622 | 9/1936 | Manning | 192/107 C |
| 2,101,410 | 12/1937 | Nutt et al. | 192/107 C |
| 2,107,741 | 2/1938 | Reed | 192/107 C |
| 2,141,164 | 12/1938 | Brehm | 192/107 C |
| 2,194,793 | 3/1940 | Higgs | 192/107 C |
| 2,195,666 | 4/1940 | Wolfram | 192/107 C |
| 2,244,134 | 6/1941 | Thelander . | |
| 2,566,394 | 9/1951 | Zeidler | 192/107 C |
| 2,613,785 | 10/1952 | Mohns | 192/107 C |
| 2,618,369 | 11/1952 | Zeidler | 192/107 C |
| 2,784,105 | 3/1957 | Stedman | 192/107 M |
| 2,986,252 | 5/1961 | Du Bois | 192/107 M |
| 3,027,979 | 4/1962 | Pocock | 192/107 M X |
| 3,164,236 | 1/1965 | Baynes et al. | 192/107 C |
| 3,526,307 | 9/1970 | Falzone | 192/107 C |
| 4,375,254 | 3/1983 | Lech | 192/107 C |
| 4,377,225 | 3/1983 | Lech et al. | 192/107 C |
| 4,565,274 | 1/1986 | Cameron | 192/107 R |

*Primary Examiner*—Rodney H. Bonck
*Attorney, Agent, or Firm*—F. B. McDonald

[57] ABSTRACT

A driven clutch disk assembly adapted for use in a friction clutch includes a system for controlling clutch engagement friction, whereby an increasing surface contact friction area is presented in order to limit clutching capacity over an initial clutch engagment period. The result is a substantial reduction of the chatter which tends to occur in clutch systems which utilize metallic friction elements. In a preferred form, the clutch disk assembly incorporates a pair of circumferentially extending cantilevered spring beams, both positioned intermediately of a pair of backing plates, each spring beam loaded against one of the pair. An associated friction element secured to the backing plate will thereby have a crowned surface for initial clutch engagement. The surface will collapse during engagement to ultimately present a full flattened friction surface area. The invention thereby tends to obviate the chatter problem.

8 Claims, 2 Drawing Sheets

CLUTCH DISK WITH SPRING CUSHIONED FRICTION ELEMENT

BACKGROUND OF THE INVENTION

This invention relates to driven clutch disk assemblies adapted for use in dry friction clutches. More particularly, the invention relates to the use of cushioned friction systems within such disk assemblies for the purpose of reducing friction forces during initial clutch engagement.

The conventional clutch disk assembly for automotive and other vehicular use includes a hub having a flanged portion secured to an integral flat disk. The disk typically has a plurality of friction pads riveted or bonded to its sides. The disk is positioned, by means of the hub on a transmission input shaft, between a flywheel and a reciprocal pressure plate driven by an internal combustion engine or electric motor. Upon depression of a clutch pedal, the pressure plate is axially moved away from the flywheel to disengage the clutch, and, upon release of the pedal, the pressure plate moves the disk toward the flywheel to engage the disk between the pressure plate and flywheel.

In clutches without cushioned friction systems, the entire friction contact area of the clutch disk becomes substantially engaged between the flywheel and pressure plate simultaneously, wherein the clutch may chatter due to the typically aggressive, grabby nature of the friction material; particularly, where such friction material is metallic. Such chatter is generally evidenced as noise and vibration, and occurs whenever the operator first engages the clutch. Upon initial clutch engagement in such prior art systems, torque demand tends to exceed clutch capacity, wherein the friction pads of the disk alternately grab and break loose, resulting in jerky starting movement of the vehicle.

SUMMARY OF THE INVENTION

The driven clutch disk assembly of the present invention incorporates a spring cushioned friction element assembly which operates to reduce initial clutch engagement friction forces, hence to obviate the problem of chatter in dry friction clutches. The spring cushioned element assembly avoids initial full engagement of available friction area, and provides for a continuously increasing amount of clutch engaging friction material. At initial clutch engagement a small amount of clutching capacity is provided by means of an initial use of a smaller surface friction contact area than that totally available. As clutch engagement progresses, the contact area increases, thus achieving full available friction contact area at full clutch engagement. The spring cushioned friction element system of this invention thus provides a means for avoidance of aggressive or grabby clutching, and hence the chatter phenomena normally associated therewith.

In a preferred form, the driven clutch disk assembly of the present invention includes a unitary disk having a central aperture for accommodating securement of the disk to a hub for placement on a transmission input shaft. A plurality of secondary apertures are spaced radially outwardly of the central aperture, each secondary aperture defining a pair of circumferentially spaced radial boundaries. A pair of backing plates are each secured to opposite sides of each secondary aperture, each backing plate containing a friction element laminated or otherwise bonded to the plate. Each backing plate has an overlap portion secured along each side of the spaced radial boundaries of each secondary aperture. Each radial boundary of each secondary aperture contains an integral circumferentially extending cantilevered spring beam positioned between the pair of backing plates associated with that particular aperture. Each beam is spring loaded against one of the backing plates, and in the preferred form one of two beams is spring loaded against one backing plate, while the other beam is spring loaded against the other, opposing, backing plate. Each beam is disposed against the backing plate in a matter such that it applies a normal force producing elastic displacement of the backing plate and the friction element bonded to that plate. The friction element thus contains a slightly convex friction engagement surface, wherein the resultant "crowned" surface area will initially make contact with either the flywheel or pressure plate at the outermost extremity of the crown. As the crowned friction surface area collapses under clutch engagement, the full available friction surface area will gradually become engaged, thus presenting a variably increasing surface friction contact area as clutch engagement ensues.

DESCRIPTION OF A PREFERRED EMBODIMENT

Figure 1:
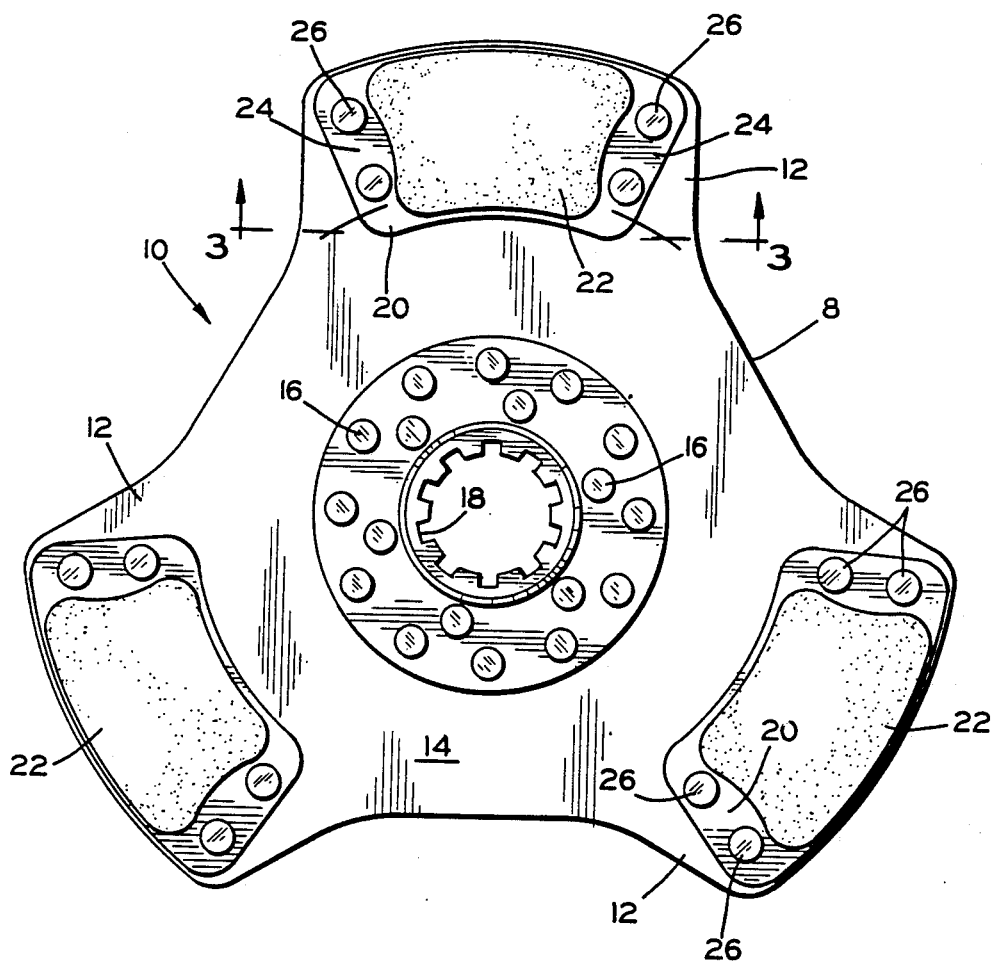
FIG. 1 is a face view of a driven clutch disk assembly constructed in accordance with the present invention.

Referring initially to FIG. 1, a driven clutch disk assembly 10 is positioned between a flywheel and a reciprocal pressure plate (neither shown). The assembly 10 includes a unitary disk 8 having a plurality of radially extending segments or lobes 12 which emanate from a central disk portion 14. The portion 14 is secured to a central hub 18 by means of rivets 16, the hub being splined for installation on a transmission input shaft (not shown).

Figure 2:
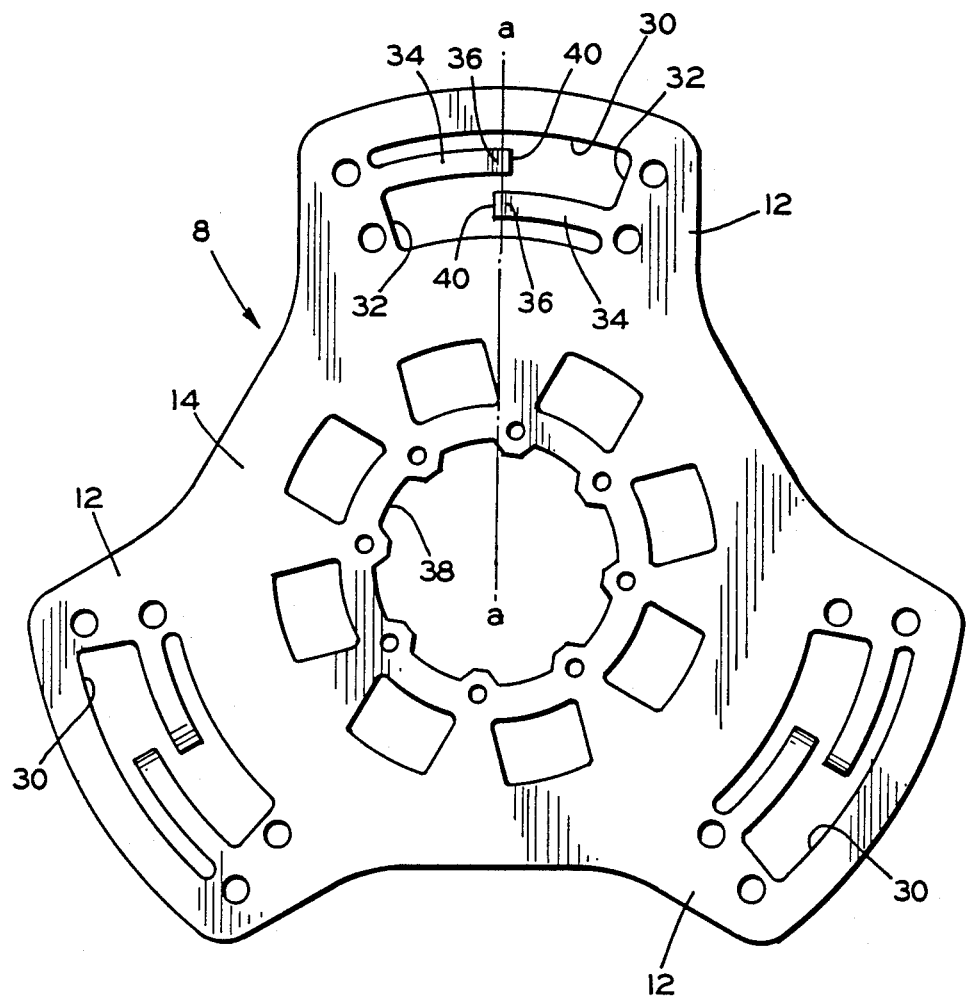
FIG. 2 is a unitary disk of the present invention, shown separately, and constructed in accordance with a presently preferred embodiment.

Referring momentarily to FIG. 2, the unitary disk 8 is shown separately and apart from the driven disk assembly 10. The disc 8 contains a primary central aperture 38 as well as a plurality of secondary apertures 30. It will be appreciated that each individual lobe 12 of the disk 8 incorporates an aperture 30. Referring now back to FIG. 1, it will be appreciated by those skilled in the art, that a pair of backing plates 20 are installed over each aperture 30, one backing plate secured to each side of one lobe 12. Thus each associated set of backing plates is oppositely secured to one lobe 12 and to each other by means of the rivets 26; each rivet 26 extends through both backing plates as well as through the associated lobe 12 Each backing plate has a pair of circumferentially spaced overlap portions 24 secured along the radial sides of the aperture 30 in the associated lobe. Secured by lamination or bonding to each backing plate is a friction element 22, wherein a pair of friction elements are associated with each lobe, one secured to each backing plate as will be appreciated by those skilled in the art.

Referring back now to FIG. 2, each aperture 30 includes a pair of spaced radially extending boundaries 32. Emanating circumferentially from each boundary 32 is a cantilevered spring beam 34, each beam having a backing plate contact portion 36. The portion 36 is radially arcuate in its preferred form, having its center positioned to lie on a radially extending line "a—a" which passes through the radial center of the secondary aperture 30 as well as through the center of the central aperture 38 of the central disk portion 14.

Figure 3:
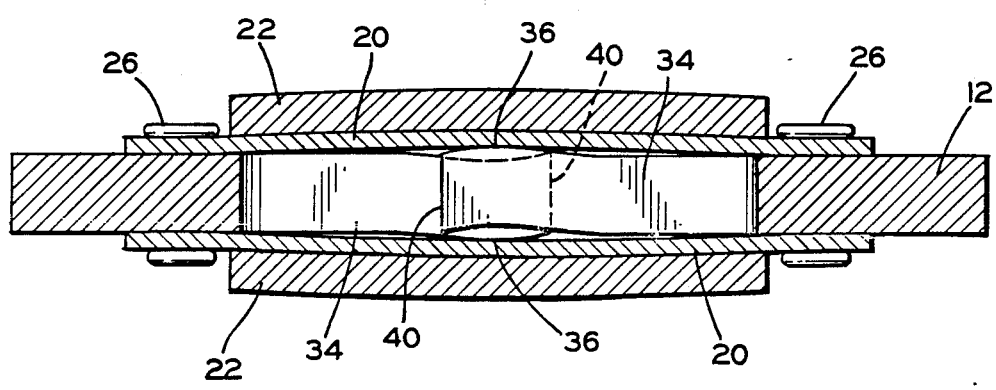
FIG. 3 is a view along lines 3—3 of FIG. 1.

Referring now to FIG. 3, it will be appreciated by those skilled in the art that the beams 34 are made of spring steel for greatest effectiveness. In the presently preferred embodiment, there are two of such beams 34, each extending from opposite or opposing boundaries 32 of the aperture 30. To the extent that the beams have contact areas lying on the radially extending center-line "a—a" as heretofore noted, the beams will have extremities 40 which extend beyond each other, but must yet avoid interference or contact with each other. For this purpose, the beams in the preferred embodiment are radially off-set from each other. A preferred process for forming the unitary disk 8 is via stamping.

Continuing reference to FIG. 3, it will be appreciated by those skilled in the art that the beams 34 are adapted to bear against the back sides of the associated backing plates 20. In a preferred form, the net result will be that a slightly convex or crowned friction surface is established over the surface of the friction elements 22 for initial contact thereof with the flywheel and pressure plate members. Thus, the engaging surface of the friction elements 22 will be elastically displaced by virtue of a normal beam spring force to form a crowned surface. The convexity of the crowned surface will tend to decrease, and hence flatten out, during clutch engagement under the resilient cushioning force of the beam which is overcome by the clutch engagement forces. As earlier noted, the arcuate backing plate contact area 36 of each beam will have its radial center coincident with the radius "a—a" which extends through the center of the secondary aperture 30. Thus, the convexity of the friction element 22 will be preferably symmetrical. Although symmetry is present in all dimensional aspects of the asdescribed embodiment of the present invention, this invention also contemplates asymmetrical convexities as falling within its scope.

In the preferred form, the present invention also contemplates the use of a friction element formed of a copperceramic material, preferably eighty (80) percent copper. As an example, a unitary disk 8 of 14 inches in diameter has a thickness in the range of 90–110 thousandths of an inch. Each backing plate has a thickness of 50 thousandths or half of the disk thickness, and is preferably formed of a SAE 10-30 steel material. Each copper-ceramic friction element has a thickness of approximately 100 thousandths of an inch, and is displaced convexly outwardly at its center-most point by approximately three to seven (3 to 7) thousandths of an inch for greatest effectiveness.

Finally, although only one preferred embodiment has been detailed and described herein, the following claims envision numerous additional embodiments which fall within the scope thereof.

What is claimed is:

1. In a driven clutch disk assembly adapted for use in a friction clutch, said disk assembly comprising a unitary disk having a central aperture therethrough, said unitary disk further having a secondary aperture spaced radially outwardly of said central aperture, said secondary aperture defining a pair of circumferentially spaced radial boundaries, said disk assembly further comprising a pair of backing plates having first and second sides, each plate having a pair of circumferentially spaced overlap portions, each plate having said first side secured to one side of said disk over said secondary aperture in a manner such that each plate has one overlap portion thereof secured along the side of one of said spaced radial boundaries of said secondary aperture, each backing plate containing a friction element secured to said second side of side plate; an improvement wherein at least one of said radial boundaries spring beam positioned intermediately of said backing plates, said beam extending circumferentially, and wherein said beam is spring-loaded against one of said backing plates, wherein said cantilevered spring beam has a spring force producing an elastic displacement of said associated backing plate and friction element, whereby said friction element normally comprises a crowned surface which collapses during the process of clutch engagement, wherein each of said radial boundaries of said secondary aperture comprises a spring beam, and wherein said plurality of beams extend opposingly toward each other from said spaced radial boundaries, whereby the extremities of said beams extend beyond each other, but do not contact one another.

2. The driven clutch disk assembly of claim 1 wherein said beams are radially offset from one another.

3. The driven clutch disk assembly of claim 2 wherein said clutch disks comprises a plurality of radially extending lobes, wherein one pair of backing plates and one associated pair of friction elements are secured to said one secondary aperture of each of said lobes.

4. The driven clutch disk assembly of claim 3 wherein one beam is spring loaded against one backing plate, and another beam is spring loaded against the other backing plate.

5. The driven clutch disk assembly of claim 4 wherein each beam has an arcuate backing plate contact area, said arcuate contact area having its radial center coincident with a radius extending through the center of said secondary aperture from the center of said central aperture.

6. The driven clutch disk assembly of claim 5 wherein said beams are integral parts of said disk, and wherein said disk is formed of a spring steel material.

7. The driven clutch disk assembly of claim 6 wherein each friction element is laminated to its associated backing plate to form one integral member therewith.

8. The driven clutch disk assembly of claim 7 wherein said friction element is formed of a copper-ceramic material.

* * * * *